United States Patent [19]
Long

[11] 3,747,846
[45] July 24, 1973

[54] ELEMENTARY CIRCULAR SLIDE RULE
[76] Inventor: William C. Long, 6415 Indigo, Houston, Tex. 77036
[22] Filed: July 8, 1971
[21] Appl. No.: 160,642

[52] U.S. Cl.................... 235/84, 235/78, 35/31 A
[51] Int. Cl. ...................... G06g 1/08, G09b 19/02
[58] Field of Search ........................... 235/847, 888; 35/31 A, 39, 74

[56] References Cited
UNITED STATES PATENTS

| | | | |
|---|---|---|---|
| 614,454 | 11/1898 | Fish ...................................... | 235/78 |
| 920,840 | 5/1909 | Dreyfus et al. ....................... | 235/78 |
| 1,211,581 | 1/1917 | Henoch................................. | 235/84 |
| 2,965,980 | 12/1960 | Day....................................... | 235/88 |
| 3,206,115 | 9/1965 | Norman................................. | 235/84 |

Primary Examiner—Stephen J. Tomsky
Attorney—Michael P. Breston

[57] ABSTRACT

This invention relates to a circular slide rule which is particularly adapted for facilitating the learning process of addition and/or subtraction by primary grade students. The slide rule includes a bottom disc, a top disc, and a problem indicator, all coaxially mounted for relative rotation. The problem indicator, in a preferred embodiment, defines a window which is adapted to display only a single number from a scale on the bottom disc and a single number from the scale on the top disc. The algebraic sum of the two numbers displayed in the window of the indicator is read off on one of the scales as being the number opposite to an answer mark on the other scale.

3 Claims, 6 Drawing Figures

3,747,846

PATENTED JUL 24 1973

INVENTOR.
WILLIAM C. LONG,
BY
MICHAEL P. BRESTON,
ATTORNEY.

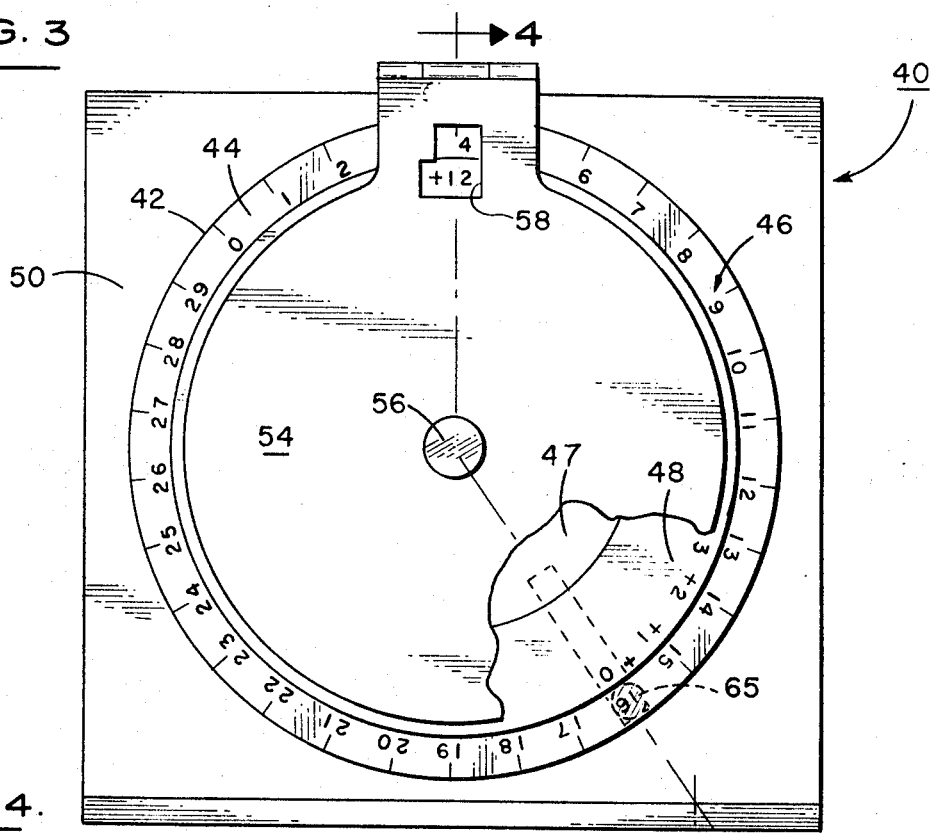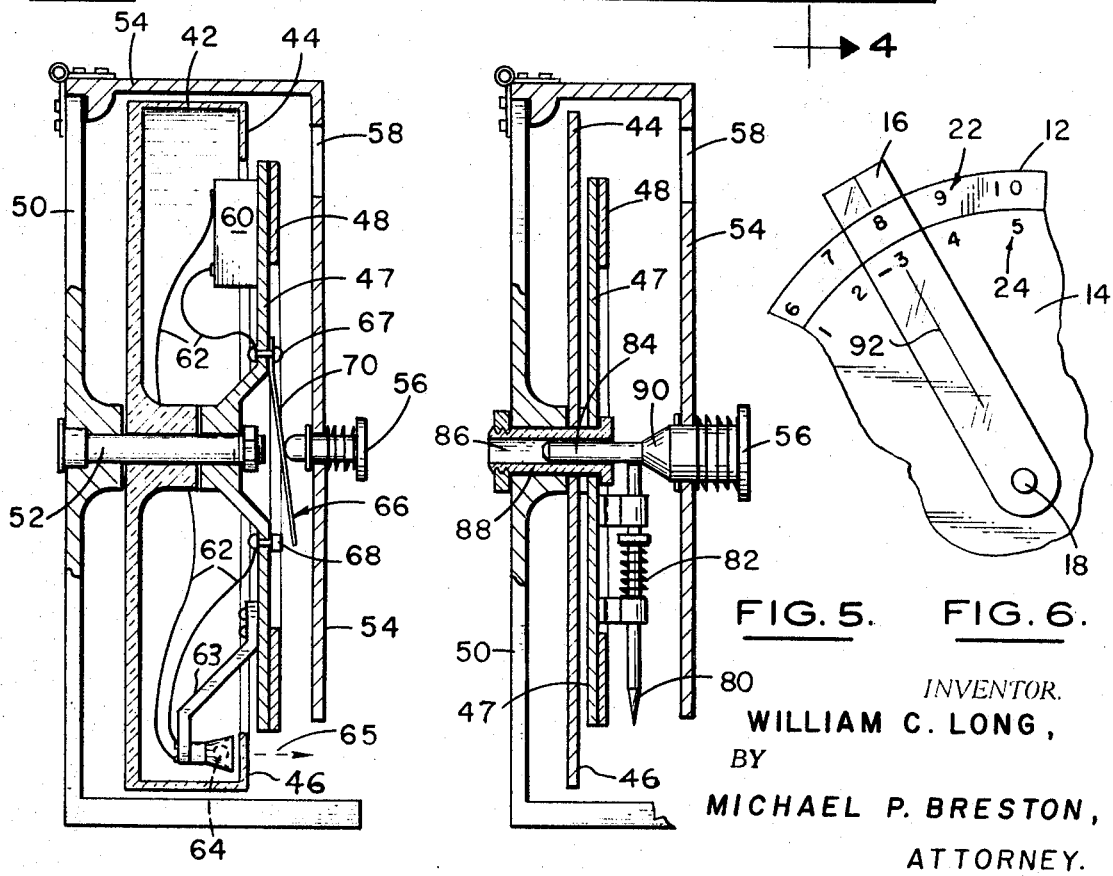

ELEMENTARY CIRCULAR SLIDE RULE

BACKGROUND OF THE INVENTION

Various educational devices have been proposed for facilitating a child's process of learning elementary additions and subtractions. A most common method, even at present, is for the child to use its fingers to obtain the answers to simple arithmetic problems involving additions and subtractions. While being very dependable, this method is time consuming and limited by the number of available fingers.

Flash cards are also frequently employed as an aid in teaching elementary arithmetic problems. Such cards, while serving a useful porpose, have certain well-known drawbacks: the cards have to be kept sorted, each problem is usually set out on a separate card, and children frequently lose some of the cards. In addition, by providing the problem and the answer on the same card, the challenge which is normally associated with setting up the problem and with independently finding its solution is not available to the child when using such flash cards.

Various mechanical educational devices, including slide rules, have been proposed. Such devices and slide rules as are known to me have definite limitations which can be summarized as follows: most of such devices set up the arithmetic problem through methods which are too cumbersome for a primary grade student. The straight slide rules, in which a problem can be set up at one position and the answer read at another position, are limited to one mode of operation only, that is either to addition or to subtraction. Also, the sliding member in such straight slide rules frequently becomes lost.

Accordingly, it is a main object of this invention to provide a new and improved circular slide rule. The disposition of the scales on the slide rule's rotatable discs is such that their inter-relationship can be easily comprehended by a beginner in arithmetic.

It is another object of this invention to provide such a circular slide rule which allows speed of operation, and which can be inexpensively manufactured.

It is a further object of this invention to provide such a circular slide rule which greatly facilitates the learning process of simple additions and subtractions by primary grade students.

SUMMARY OF THE INVENTION

The circular slide rule of this invention includes at least two discs and one problem indicator all stacked in coaxial relationship for relative movement therebetween. The bottom disc has a relatively large diameter and bears near its outer periphery on each face thereof a circular numerical scale which is divided into equal arcuate increments. The top disc bears near its outer periphery on each face thereof a similar numerical scale. The arcuate increments on both scales are subtended by the same angular value.

The problem indicator defines, in a preferred embodiment, a window overlapping both scales and extending in a radial direction for displaying only one number from each scale. The numbers appearing in the window are to be added or subtracted. The answer to the problem is read on one scale opposite to an answer marker on the other scale. Problems of addition are solved by using scales on one side of the discs, and problems of subtraction are solved by using scales on the opposite side of the discs.

Other embodiments using the same or similar principles can include means for electrically controlling the read-out of the answer, as by illuminating the answer, or by pointing to the answer with a movable mechanical pointer.

BRIEF DESCRIPTION OF THE DRAWINGS

FIG. 3 is a front view in elevation of another embodiment of this invention;

FIG. 4 is a sectional view taken along line 4—4 in FIG. 3;

FIG. 5 is a sectional view of yet another circular slide rule embodying a modification to the embodiment shown in FIG. 4; and FIG. 6 is a partial view of a modified problem indicator for the embodiment shown in FIGS. 1 and 2.

In the drawings, the same reference characters designate the same or similar parts.

Figure 1:
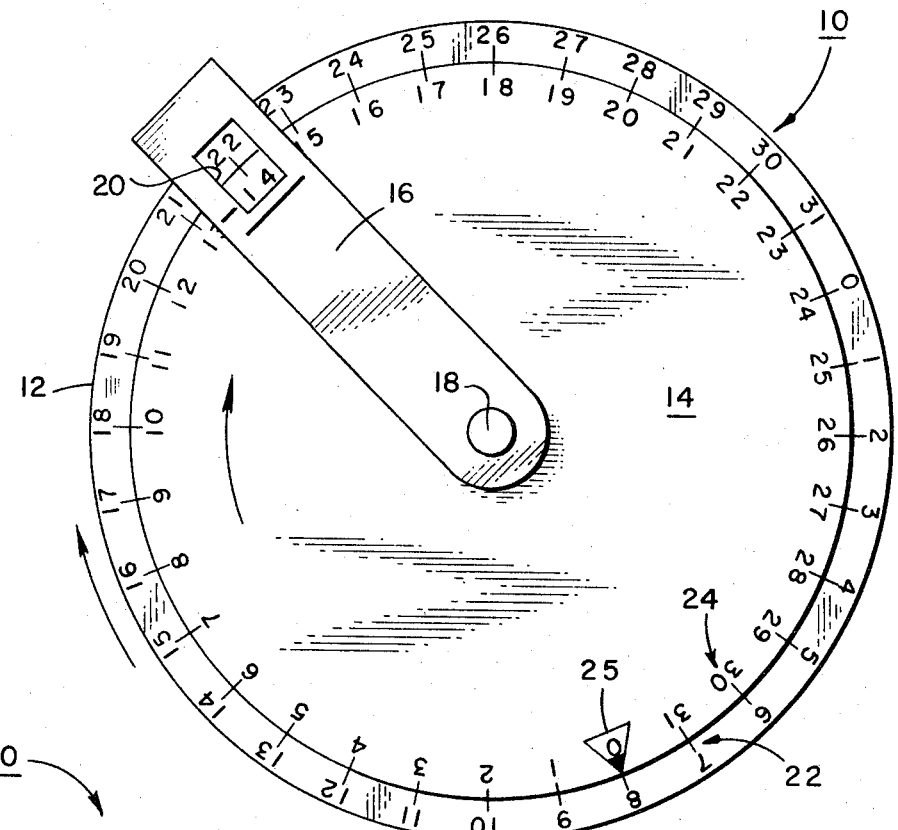
FIG. 1 is a schematic top view of one side of a preferred embodiment of the circular slide rule of this invention.
Figure 2:
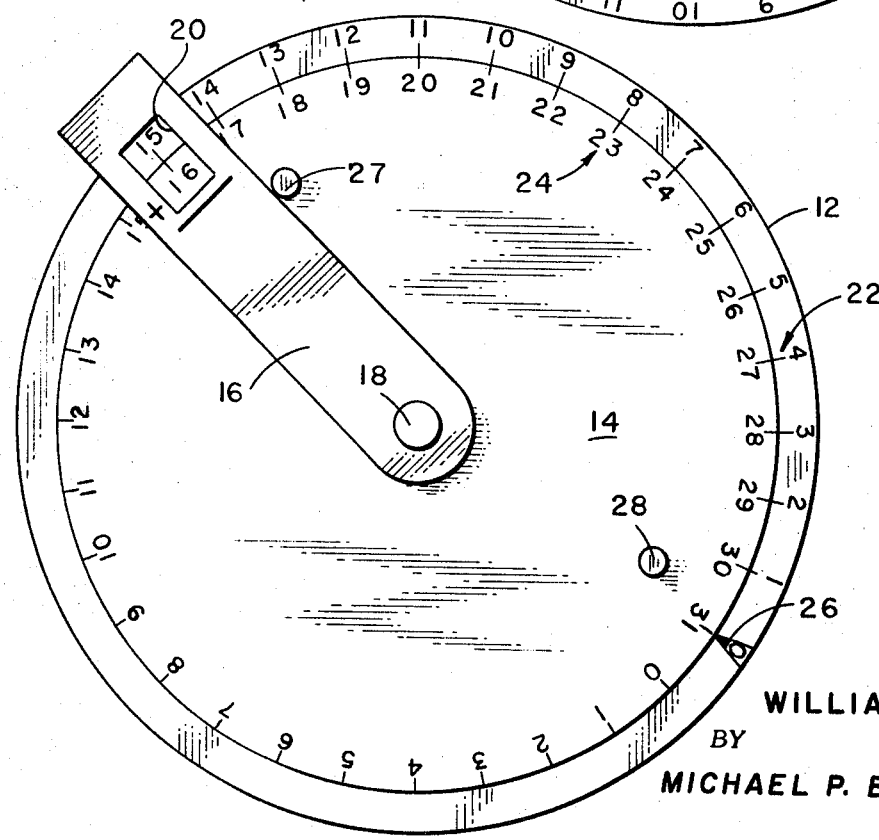
FIG. 2 is a schematic top view of the opposite side of the embodiment shown in FIG. 1.

Referring now to the embodiment illustrated in FIGS. 1 and 2, the circular slide rule of this invention is generally referenced as 10. Slide rule 10 includes a bottom disc 12, a top disc 14, and a folded problem indicator 16, all stacked in a coaxial relationship for relative rotation on a stub shaft 18 to which they can be detachably secured by a nut (not shown), or by any other means.

The diameter of disc 12 is larger than that of disc 14. Indicator 16 preferably defines in each side thereof a radially-extending, index preferably in the form of a slot or window 20. Inscribed near the outer edges of discs 12 and 14 are circular, numerical scales 22 and 24, respectively. Each of scales 22, 24 is divided into arcuate increments of equal length which are subtended by the same angular value, as shown. The area of the opening defined by window 20 is such as to allow the display of only one number from each scale.

When the scales have their numbers progressively advancing in the same direction, say clockwise, as in FIG. 1, the numbers appearing in the window of the problem indicator 16 are set up for subtraction. On the other hand, if the scales have their numbers progressively advancing in opposite directions, as shown in FIG. 2, the numbers appearing in the window of the problem indicator 16 are set up for addition.

In the case of subtraction (FIG. 1), the answer indicator 25 on scale 24 (which is also the zero mark) points to the number on scale 22 which is the answer to the problem. Thus in FIG. 1, 22−14=8.

In the case of addition (FIG. 2), the answer indicator 26 on scale 22 (which is also the zero mark) points to the number on scale 24 which is the answer to the problem. Thus in FIG. 2, 15+16=31.

In the case of addition, stop lugs 27, 28 are provided on the face of disc 14 to prevent indicator 16 from moving to a number which would cause the slide rule 10 to become off scale. Thus in FIG. 2, the highest answer is the number 31 (15+16). For this reason the scale 22 in FIG. 2 extends only from 0 to 15.

Referring now to the embodiment shown in FIGS. 3 and 4, the circular slide rule, now generally designated as 40, includes an inner, annular member 42 having a C-shaped cross-section and comprising a translucent ring 44. On ring 44 is inscribed a circular scale 46 similar to scale 22. Scale 46 advances in a clockwise direction. Rotatably mounted with member 42 is a disc 47 which detachably supports an annular, interchangeable scale 48 similar to scale 24. Scale 48 may have its numbers progressing in a counter-clockwise direction or in a clockwise direction depending, respectively, on whether addition or subtraction is desired.

In FIGS. 3 and 4, scale 48 advances counter-clockwise. A housing 50 rotatably supports member 42 and disc 47 on a shaft 52. A hingedly-mounted, L-shaped problem indicator 54 is provided with a spring-biased, push-button 56 and an index or window 58. Window 58 serves the same function as index or window 20. A battery 60 mounted on the inside face of disc 47 is electrically connected by wires 62 to a suitable light bulb 64 providing a focused light beam 65. Light bulb 64 is mounted on an arm 63 which is mounted to and rotates with disc 47. A switch 66, having two terminals 67, 68, is closed by depressing push-button 56 which allows a flexible contact spring 70 to electrically contact both terminals 67 and 68.

In operation of the embodiment shown in FIGS. 3 and 4, to set up the addition problem, say 4+12 (FIG. 3), the disc 47 is rotated relative to ring 44 until the numbers 4 and 12 are opposite each other in window 58. The child is then asked to provide the answer to the problem set up. The correctness of his answer can be checked by depressing push-button 56. The answer to the above given problem is 16, and the number 16 will be illuminated, as shown in FIG. 3, by the light beam 65 on scale 46.

The embodiment illustrated in FIG. 5 is in most respects similar to the embodiment shown in FIG. 4, except that instead of employing a light source to illuminate the answer, there is now employed a biased-pointer 80 which is normally biased radially inwardly by a coil spring 82. When the answer to the problem is desired, the push-button 56 is pushed in. The piston 84 of button 56 slides inwardly into a bore 86 provided in a bushing 88. The conical shoulder 90 of push-button 56 will then cause pointer 80 to move downwardly. Pointer 80 will point to the correct answer on scale 46 in a manner similar to the light beam 65.

In the embodiments shown in FIGS. 4 and 5, the inner scale 48 is detachably secured to the inner disc 47 in any suitable manner. Scale 48 can be turned over to provide on its opposite face a scale with numbers progressing in an opposite direction, say clockwise for subtraction. Thus, the same scale can be used to perform an algebraic sum which can be either an addition or a subtraction.

While in the preferred embodiments the problem indicator 16 is shown as having a window or index 20, the indicator 17 could instead have a radially-extending index or hairline 92, as shown in FIG. 6.

In FIG. 6, the numbers selected for a subtraction problem are, say, 8 and 3 which are aligned under the hairline 92 on scales 22 and 24, respectively.

Among the many advantages derived from using the circular slide rule of this invention are the following: the problem is presented with the numbers aligned vertically, with a + or − sign, in a manner to which the child is accustomed; the two scales 22 and 24 can be held together and the problem indicator 16 rotated to allow the child to learn all combinations which yield the same answer; or one of the discs 12 or 14, is rotated relative to the other disc and the indicator, both stationary, to allow the child to learn the answers to progressively advancing problems. Other advantages will readily become apparent from the preceding description.

What I claim is:

1. A circular slide rule having a front face for solving elementary addition problems by beginners and a back face for solving elementary subtraction problems, said slide rule comprising:

a first disc having on each face thereof near it outer periphery a circular numerical scale divided into equal-length arcuate segments;

a second disc having on each face thereof near its outer periphery a circular numerical scale divided into equal-length arcuate segments;

said arcuate segments of said first and second discs being subtended by the same angular value and the diameter of said first disc being larger than the diameter of said second disc, the scales on the front face of the slide rule progressively advancing in opposite circumferential directions, and the scales on the back face of the slide rule progressively advancing in the same circumferential directions;

a first problem indicator having a radially-extending index;

a second problem indicator having a radially-extending index;

means rotatably supporting said first and second discs and said first and second problem indicators for rotation about a common axis extending through the center of each disc, whereby;

the front face of said first disc, the front face of said second disc, and said first problem indicator constitute said front face of said slide rule, and the back face of said first disc, the back face of said second disc, and said second problem indicator constitute said back face of said slide rule;

a first answer indicator on one of the scales on the front face of said slide rule;

a second answer indicator on one of the scales on the back face of said slide rule;

the radially-extending index on the first problem indicator being adapted to align a single number from the scale on the front face of the first disc with a single number on the front face of the second disc, whereby the two aligned numbers constitute a desired problem of addition and the first answer indicator providing the sum of the aligned numbers;

the radially-extending index on the second problem indicate being adapted to align a single number from the scales on the back face of the first disc with a single number on the back face of the second disc, whereby the two aligned numbers constitute a desired problem of subtraction and the second answer indicator providing the difference between the aligned numbers; and the body of said first problem indicator defining an opening serving as a window through which only the aligned numbers on the front face of the slide rule are visible.

2. The slide rule of claim 1 wherein the body of said second problem indicator defines an opening serving as a window through which only the aligned numbers on the back face of the slide rule are visible.

3. The slide rule of claim 1 wherein said first and second problem indicators are coupled together at their ends.

* * * * *